Figure 4:
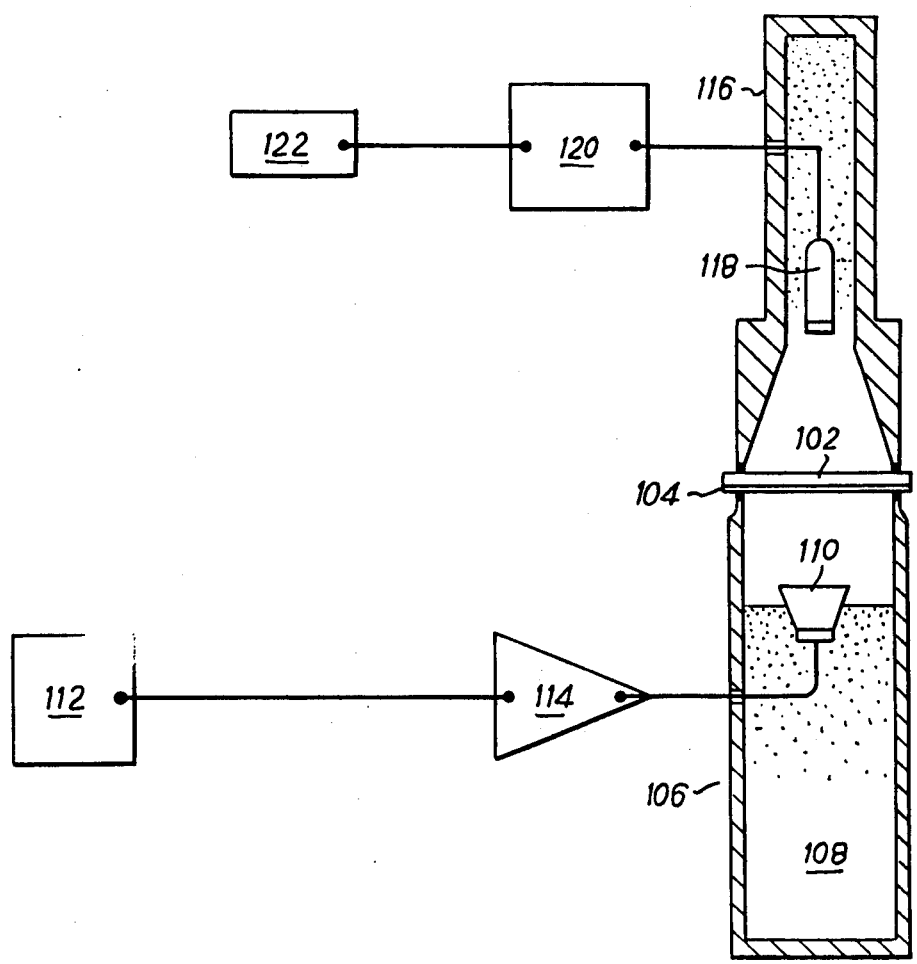

United States Patent [19]

Kingsbury

[11] 4,048,366
[45] Sept. 13, 1977

[54] NOISE CONTROL MATERIALS

[75] Inventor: Herbert William Kingsbury, Chislehurst, England

[73] Assignee: British Uralite Limited, near Rochester, England

[21] Appl. No.: 595,722

[22] Filed: July 14, 1975

[30] Foreign Application Priority Data

July 26, 1974 United Kingdom ............... 33185/74

[51] Int. Cl.² .................... B32B 7/02; B32B 11/02
[52] U.S. Cl. ............................. 428/215; 123/195 C; 123/198 E; 181/204; 428/443; 428/444; 428/302; 428/468; 428/457; 428/489
[58] Field of Search ............... 428/468, 469, 215, 457, 428/444, 302, 443, 489; 123/195 C, 198 E; 181/33 GA, 62

[56] References Cited

U.S. PATENT DOCUMENTS

| | | | |
|---|---|---|---|
| 2,057,071 | 10/1936 | Stranahan | 428/468 |
| 2,240,326 | 4/1941 | Burns | 428/468 |
| 2,440,626 | 4/1948 | Young | 428/468 |
| 2,472,100 | 6/1949 | Fair | 428/468 |
| 2,668,781 | 2/1954 | Jenkins | 428/468 |
| 2,678,891 | 5/1954 | Jenkins | 428/468 |
| 2,850,789 | 11/1974 | Kingsbury | 428/489 |
| 2,910,922 | 11/1959 | Horning | 428/489 |
| 3,573,124 | 3/1971 | Rudloff | 428/468 |

FOREIGN PATENT DOCUMENTS

| | | | |
|---|---|---|---|
| 468,843 | 10/1950 | Canada | 428/468 |
| 810,661 | 10/1951 | Germany | |
| 53,941 | 5/1934 | Norway | |
| 60,338 | 1/1939 | Norway | |
| 376,452 | 5/1975 | Sweden | |
| 499,240 | 1/1939 | United Kingdom | |
| 613,650 | 12/1948 | United Kingdom | |
| 961,665 | 6/1964 | United Kingdom | |
| 985,113 | 3/1965 | United Kingdom | |
| 1,022,167 | 3/1966 | United Kingdom | |

*Primary Examiner*—Ellis Robinson
*Attorney, Agent, or Firm*—Browdy and Neimark

[57] ABSTRACT

A noise reducing material especially suitable for attaching to internal combustion engine casing parts and comprising (a) a layer of a metal such as lead combining a high density with a low shear modulus, bonded to (b) a layer of a pliant thermoplastics matrix reinforced with fibrous material. Layer (b) is preferably asbestos fiber-reinforced bitumen and the laminate preferably comprises a layer of lead between two layers of the reinforced thermoplastics material.

10 Claims, 4 Drawing Figures

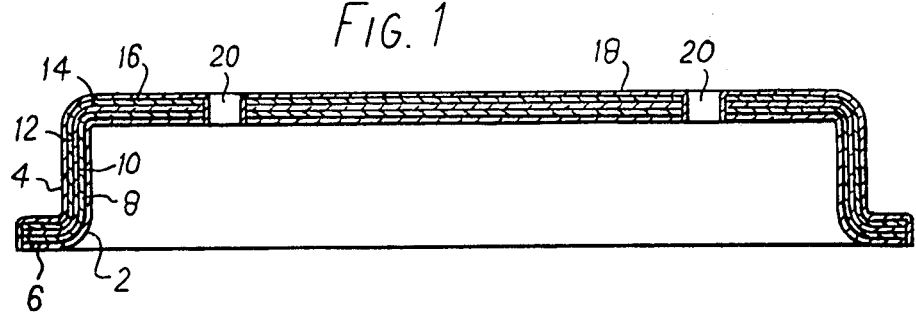
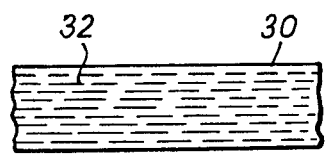
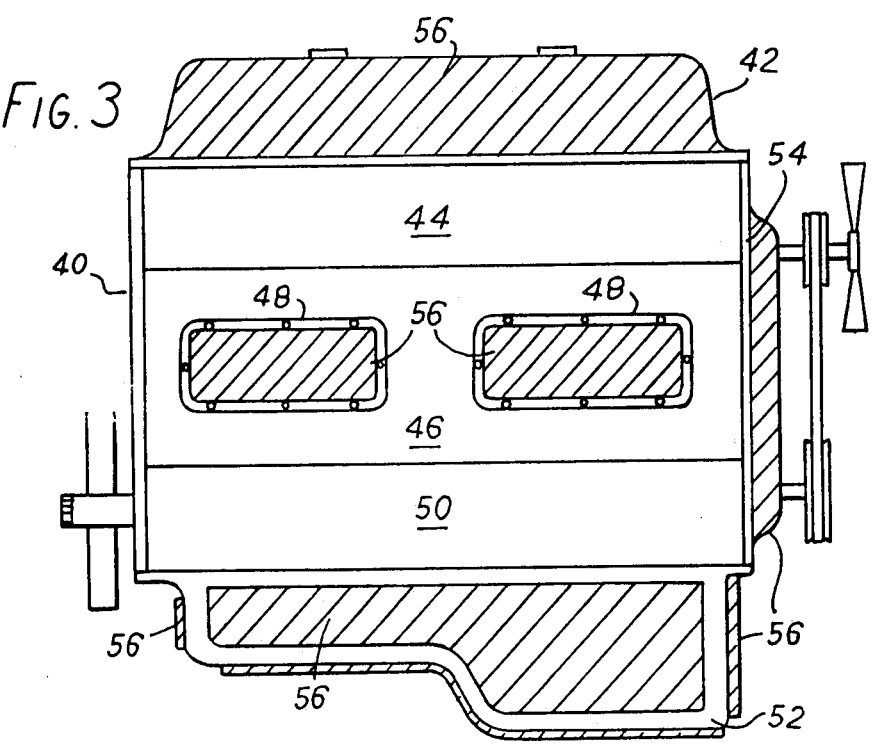

NOISE CONTROL MATERIALS

This invention relates to noise control and provides novel noise reducing materials which are particularly applicable to the reduction of noise from internal combustion engines.

According to the present invention, we provide a noise reducing material comprising a laminate including a layer of reinforced thermoplastics material comprising a matrix of low rigidity, i.e., pliant, thermoplastic material reinforced with fibrous material and, bonded to said layer, a layer of metal which has a density of at least 7 gm/cc.

Although the layer of reinforced thermoplastic material is preferably bonded directly to the metal layer, it may also be separated from the metal layer but bonded to it by at least one other layer which is interposed between and bonded to each of the metal layer and the layer of reinforced thermoplastic material.

In a preferred form of the invention, the laminate contains a layer of metal, preferably lead, with a layer of the reinforced thermoplastic material on each side. Preferably at least one of the layers of reinforced thermoplastic material is bonded directly to the metal layer i.e., without an intervening layer.

The laminates of the invention are intended for attachment as claddings to machine components which are prone to generate and/or transmit noise by vibration, such as casings and sheet metal members. They are particularly suitable for use in reducing the noise from internal combustion engines for which purpose they will be attached as claddings to engine casing components; e.g., the rocker box over, timing gear cover, crankcase, cover plates, cylinder block and sump. The laminates have the combined effect of reducing the vibration of the casing component and reducing the level of sound transmitted through the casing component.

So as to obtain optimal in overall reduction of noise improvement the metal of the metal layer in the laminate, which may be a metal or an alloy, preferably has a density of at least 10 gm/cc and desirably a shear modulus n not exceeding 4 × 10 inches dynes/sq.cm and preferably not exceeding 3 × 10 inches dynes/sq.cm when derived from the formula $$n = \frac{E}{2(1 + \sigma)}$$

where E is Youngs Modulus and $\sigma$ is the Poissons ratio.

The much preferred metal is lead.

Useful improvements can then be obtained with metal layers having a thickness of as little as 0.4 mm. However, improved results are obtained by the use of thicker layers and it is generally preferred to use thicknesses in the range 0.8 to 1.8 mm. Still further, although relatively smaller improvements can be obtained with greater thicknesses but for reasons of cost and weight the upper practical limit is considered to be about 2 mm for the metal layer.

The matrix of the reinforced thermoplastic layer is a pliant thermoplastics material. In general, the thermoplastics material will be substantially amorphous, having little or no measurable crystallinity. Such materials will also be characterized in general by being substantially non-resilient which is a desirable property in the matrix material of the invention.

The much preferred material is bitumen which is also known alternatively as asphalt. This material combines the desired pliancy and lack of resilience with ready availability and low cost. However, the use of other pliant thermoplastic materials is not excluded; examples being heavily plasticized grades of vinyl chloride polymers, and low density polyethylene.

The bitumen is preferably a grade having a softening point in the range 30° C to 155° C and a penetration in the range of 3 to 200, softening point and penetration being measured in accordance with British Standard Test Method 3235.

Because of the desirable fire-resistance so obtained, the fibrous reinforcement is preferably provided by mineral fibers, especially asbestos fibers, although the use of, for example, metal fibers, glass fibers and synthetic fibers is also contemplated. A mixture of fibers could also be used.

The fibrous reinforcement is preferably provided in the form of staple fibers and in a preferred foam of the invention, the fibers are in the form of discrete laminae within the matrix, the laminae extending parallel to the plane of the layer and the fibers of each lamina being randomly oriented in the plane of the lamina.

Most preferably, each layer of reinforced thermoplastic material comprises one or more sheets of bitumen reinforced with asbestos fiber, with the asbestos reinforcement in each sheet being in the form of laminae of asbestos fibers each lamina extending parallel to the plane of the sheet and the overall weight ratio of asbestos to bitumen in the sheet being in the range 60:40 to 40:60. Such sheets may be formed, for example, by forming a dispersion of short asbestos fibers and bitumen in water, building up the desired sheet thickness from a plurality of layers of the dispersion, e.g. by use of a board machine in a method akin to that used in paper manufacture, and thereafter heating the sheet to fuse the bitumen.

Examples of asbestos fiber reinforced bitumen sheets that may be used in the laminates of the invention are those marketed under the name "Industrialite" by British Uralite Limited of Uralite House, Higham, Kent, England. Where such sheets are utilized in the production of the laminates of the invention, the resultant laminates combine excellent and long-lasting noise reducing properties with good resistance to environmental, fungus and termite attack, water repellance, abrasion resistance, resistance to creep under normal operational conditions, and unexpectedly good fire performance. The laminates may also be readily shaped by adaptation of conventional pressing techniques using hand or machine passes and press dies similar to those used in metal pressing, and may also be punched to provide holes using punches similar to those used for cutting metal and other sheet materials. These laminates therefore find particular applicability to the reduction of engine noise since they can be readily preshaped to fit the engine casing parts and can withstand under-hood environmental conditions.

The reinforced thermoplastic layer will generally be from 1 to 10 mm thick and preferably from 2 to 6 mm thick. Although the use of greater thicknesses will generally improve the noise control performance of the laminate, the increased thickness can cause difficulties in handling and application, especially in restricted areas. Where two or more such layers are used, they may be the same or different thicknesses.

Whereas adequate results are obtained where the sole reinforcement for the thermoplastic in the layer is fibrous in form, other fillers may be included if desired; e.g., finely divided mineral fillers such as talc, and finely divided metal particles.

Layers of other materials may also be included in the laminate, if desired, e.g., for additional sound deadening or for other purposes such as decoration or protection from environmental attack. Thus, for example, layers of felt and/or of foamed plastics and/or of glass fiber may be included in the laminate and may form an internal layer or an external layer of the laminate. Also, where the laminate is to be applied, for example, to an internal combustion engine, the exposed surface of the laminate may, if desired, be treated with an oil-resistant layer, e.g., if epoxy resin or polyamide or of oil-resistant paint. In other applications, the addition of a heat-resistant layer, usually as an external layer, may be desirable.

An elastomeric surface layer has also been found useful both for environmental protection and improved noise reduction. Amongst elastomeric materials that may be used may be mentioned, in particular, polysulphide rubbers, e.g., the material marketed as TH 320/1 by Berger Chemicals of England. The polysulphide rubber layers may conveniently be applied from solution, e.g., by dipping.

In general, it is contemplated that each layer in the laminate will be continuous but the possibility of using e.g., perforated layers, especially perforated metal layers, is not excluded. Additionally or alternatively, the surfaces of the layers need not be planar. For example, they may be dimpled or recessed. However, adequate sound deadening can be obtained with continuous layers the surfaces of which are planar.

The various layers of the laminate are bonded to each other to form an integral product. Suitable adhesives for bonding the reinforced thermoplastic layer to the metal layer include polymeric adhesives such as rubber-based adhesives and for ease of manufacture of the laminate it is preferred that the adhesives can be activated by heat or the action of a solvent or its vapor. Two suitable adhesives, mentioned by way of example, are Bostik 1GA5 16 and 3Ms Scotch Grip Industrial Adhesive 1022.

The bonding may be over the entire surface of each layer or it may be discontinuous, e.g., by spot or line glueing.

In one method of forming a laminate of the invention comprising a layer of metal between two layers of reinforced thermoplastic material, two reinforced thermoplastics sheets are each treated to free them of water, e.g., by oven-drying, and a layer of heat-activatable polymer adhesive is applied to one face of each by spray, roller coating or branch coating.

The metal, e.g., lead, sheet is flattened and degreased and the adhesive is applied in similar manner to one or both faces. The laminate is assembled with the adhesive-coated faces of the various layers in contact with each other and heat is applied to re-activate the adhesive. With the adhesive activated, the laminate is consolidated by the application of pressure, e.g., by passage between the rolls of a roller press, and the adhesive is caused or allowed to set.

Where the laminates of the present invention are applied to machinery components such as casing components of an internal combustion engine, e.g., the sump, crankcase, cylinder block, rocker box cover, engine plates and/or timing gear cover of an internal combustion engine, preferably they are shaped, e.g., by molding, to conform to the shape of the component to which they are to be applied and are then bonded to the component. The laminate may be brought to the desired shape either by first forming the laminate and then shaping it, e.g., in a suitably designed press, or by separately forming each of the layers and then forming the laminate from the pre-shaped layers.

In the preferred case where each reinforced thermoplastic layer comprises one or more sheets of asbestos fiber-filled bitumen wherein in each sheet the asbestos fibers are in the form of a plurality of discrete laminae extending parallel to the plane of the sheet, these layers may be shaped by softening the bitumen and then molding the layer, e.g., by machine or hand, while the bitumen is in the softened state. The softening may be effected by heat or by exposing the layer to the vapors of a solvent for the bitumen, e.g., trichloroethylene.

The laminates may be attached to the engine casing parts in any suitable manner, e.g., by bolts, screws or other mechanical means. However, it is generally preferred to bond them to the casing parts by means of an adhesive. Preferred adhesives for this purpose are polymeric adhesives such as rubber-based adhesives. By this means, machinery components such as rocker box covers, sumps, crankcases, timing gear covers, engine plates and cylinder blocks of internal combustion engines may be separately clad with the sound deadening laminates of the invention.

In one method of cladding a machinery component with a laminate of the invention, the laminate is heated to soften the thermoplastic matrix and a suitable pattern is cut from the heated laminate, e.g., using a press. With the thermoplastic matrix in the softened state, the pattern is formed by hand or machine into the appropriate shape for cladding the component. The mating faces of the machine component, which has been previously cleaned and degreased if necessary, and of the matching laminate are then each coated with a layer of polymeric adhesive. The adhesive layers are activated, e.g., by heat, and the component and laminate are mated together and consolidated by heat and pressure. The article so formed may then be finished e.g., by applying to the exterior surfaces an oil-resistant protective layer.

The invention is illustrated in the attached drawings in which

FIG. 1 is a cross-sectional elevational view not to scale of a rocker box cover (sometimes known as a tappet cover) of an internal combustion engine clad with a laminate according to the invention, FIG. 2 is an enlarged cross-sectional view through one of the reinforced thermoplastic layers of the laminate, FIG. 3 is a representational side elevation not to scale of an internal combustion engine, various casing components of which are clad with laminates according to the invention, and FIG. 4 is a diagrammatic representation of equipment used to test the efficiency of laminates of the invention in reducing the transmission of noise.

Referring to FIGS. 1 and 2 there is shown a conventional press-stamped sheet metal rocker box cover 2 clad over substantially its entire surface by a laminate 4 which is bonded to the metal cover by a layer of adhesive 6. The laminate comprises a 2 mm thick inner layer 8 of bitumen reinforced with asbestos fiber bonded by means of a layer 10 of a polymeric adhesive to a 0.85 mm thick sheet 12 of lead which in turn is bonded by means of a layer 14 of polymeric adhesive to a 2 mm thick outer layer 16 of bitumen reinforced with asbestos fiber. The external surfaces of the clad cover are coated with a layer 18 of oil resistant paint. The rocker box cover 2 is attached to the cylinder head of the engine in conventional manner by bolts passing through the passages 20.

Each of the layers 8,16 of bitumen reinforced with asbestos fiber comprises a matrix 30 of bitumen and a plurality of laminae 32 of staple asbestos fibers, there being about four such laminae per mm of thickness of the layer and the fibers of each lamina being randomly oriented in the plane of the lamina.

FIG. 3 is a diagrammatic representation of a four cylinder diesel engine 40 having a rocker box cover 42, cylinder head 44, cylinder block 46, engine side plates 48, crankcase 50, sump 52 and front plate or timing gear cover 54. The rocker box cover, side plates, sump and front plate are each clad over part or all of their respective surfaces with a laminate 56 having the formulation described with reference to the rocker box cover of FIG. 1.

Very useful reductions in noise level can be achieved by cladding vibrating structures with laminates of the present invention. Some examples of preferred laminates of the invention and the transmission loss improvements and decay rates that have been obtained with them are set out below.

| Example | Nature of Laminate | Decay rate (dB)/sec | Average Transmission loss Improvement (dB) |
|---|---|---|---|
| 1 | Sheet A, 2mm thick/1.1mm of lead/Sheet A 2mm thick | 31 | 13 |
| 2 | Sheet A, 2mm thick/1.66mm of lead/Sheet A 2mm thick | 35 – 38 | 14 |
| 3 | Sheet A, 2mm thick/0.85 mm of lead/Sheet A 2mm thick | 28 | 12 |
| 4 | Sheet A, 2mm thick/0.49mm of lead/Sheet A 2mm thick | n.av | 10 |
| 5 | Sheet A, 1mm thick/0.49mm of lead/Sheet A 1mm thick | n.av | 7 |
| 6 | Sheet A 2mm thick/Foamed plastic 6mm thick/1.66mm lead/Sheet A 2mm thick | 29 | 14½ |

In the above Examples, Sheet A comprises a sheet of asbestos fiber-filled bitumen containing approximately equal amounts by weight of asbestos and bitumen and wherein the asbestos fibers are in the form of layers extending in the plane of the sheet, there being about 4 layers per millimeter of thickness. To asbestos fibers are of a grade in the range 6D to 4A (Quebec Standard Test) and the bitumen grade is in the range 200 PEN 30° SP to 155° SP 7 PEN and H 110/120 SP 3 PEN (British Standard Test Method 3235) where PEN is penetration and SP is softening point.

The lead was to British Standard 1178.

The layers are bonded together with Bostik 1GA5 16 adhesive.

Referring to FIG. 4, the transmission loss improvement values were obtained by bonding a sample 102 of the sound deadening sheet to a steel disc 104 of about 240 mm diameter and 0.8 mm in thickness, using Bostik 1GA5 16 adhesive and placing the disc on the open mouth of a vertical tube 106 which is closed at the other end and is partially filled with polyurethane foam 108. Located in the tube 106 is a loudspeaker 110 to which white noise is supplied by means of a white noise generator 112 and power amplifier 114. On top of the sample/disc combination is placed a second tube 116 in which is located a microphone 118 connected to a 1-octave filter 120 and a sound level recorder 122. The values for transmission loss improvement were measured over a range of frequencies up to about 4000 Hz and the Table above shows the average value of transmission loss improvement over the frequency range for which measurements were carried out.

From comparative examples in which values were obtained for transmission loss improvement for the lead alone (1.1 mm and 1.66 mm thickness) and for the reinforced thermoplastics layers alone (4mm thickness), it was found that the increases in transmission loss improvement achieved by use of the laminates of Examples 1 and 2 were greater than would be expected from the mass law.

The values of decay rate were obtained using the test procedure set out in British Standard AU 125 of 1966.

All tests were carried out between 15° and 20° C.

EXAMPLE 7

In a further Example, the laminate of Example 1 was used to clad the entire casing, i.e., rocker box, sump, cylinder head, engine block, crankcase and timing gear cover, of several samples of a commercial 1760cc 4 cylinder diesel engine. The following values for noise reduction were obtained from tests carried out in an anechoic chamber.

| Microphone location (20" from surface) | Range of Noise Reduction measured on series of Sample Engines |
|---|---|
| Front (crank center) | 2 – 6 dB'A' |
| Right (crankcase mid-position at crank level) | 2 – 6 dB'A' |
| Left (crankcase mid-position at crank level) | 2 –7 dB'A' |
| Above (central point of tappet cover) | 2 – 5 dB'A' |

EXAMPLE 8

The casing of the conventional diesel engine was treated with the laminate of Example 1. After a test run from the United Kingdom through France and Spain and thence to Morocco and over the Atlas Mountains and back by the same route to the United Kingdom, no deterioration was observed in the sound deadening properties or physical appearance of the laminate.

Whereas the laminates of the present invention find particular application in reducing the noise from internal combustion engines, they may also be used in other applications where it is desired to reduce the noise emanating from machinery.

EXAMPLE 9

One face of the laminate of Example 2 was coated with a 1 mm thick layer of Berger Chemicals' TH 320/1 polysulphide rubber. The decay rate of the coated laminate, using the test procedure of British Standard AU 125 of 1966 was measured as 39½ dB/sec.

EXAMPLE 10

One face of the laminate of Example 2 was coated with a layer of Berger Chemicals' Th 320/1 polysulphide rubber. The thickness of the layer varied between 1.5 mm and 2.5 mm. The transmission loss improvement obtained by the polysulphide rubber coating was measured using the apparatus and method described above with reference to FIG. 4 over the frequency range 400 - 6300 Hz, taking measurements at ⅓ octave intervals. The results indicated that the polysulphide layer improved the transmission loss of the laminate, particularly in the region of 2000 - 2500 Hz.

I claim:

1. A noise reducing combination, comprising a component which is prone to vibrate and, applied to at least a part of the surface thereof, a vibration damping material consisting essentially of a laminate of a metallic sheet which is from 0.4 mm to 2 mm thick and has a density of at least 7 gm/cc and wherein the metal is a metal having a shear modulus not exceeding $4 \times 10^{11}$ dynes per square centimeter and, adhesively bonded to each face of said sheet, a layer of reinforced thermoplastic material comprising a matrix of pliant thermoplastic material reinforced with fibrous material in the form of staple fibers forming a disperse phase in the matrix, wherein the metallic sheet is spaced from said surface of said component by one of said layers of reinforced thermoplastic material.

2. A combination in accordance with claim 1, wherein said component is an engine casing component of an internal combustion engine.

3. A combination in accordance with claim 1, in which the exposed surface of the laminate is provided with a protective layer of polysulfide rubber.

4. A combination in accordance with as claimed in claim 1 in which the thermoplastic material is bitumen.

5. A combination in accordance with as claimed in claim 1 in which the fibrous reinforcement is provided by mineral fibers.

6. A combination in accordance with claim 5 in which the fibers are asbestos fibers.

7. A combination in accordance with claim 1 in which the staple fibers are present in the form of a plurality of discrete laminae within the layer of reinforced thermoplastic material, the laminae extending parallel to the plane of the layer and the fibres of each lamina being randomly oriented in the plane of the layer.

8. A combination in accordance with claim 1 in which the metallic sheet is a sheet of lead.

9. A combination in accordance with claim 1 wherein said laminate comprises a sheet of lead between the bonded to each of two layers of reinforced thermoplastic material each of which comprises bitumen reinforced with staple asbestos fibers which are in the form of a plurality of discrete laminae within the layer, the laminae extending parallel to the plane of the layer and the fibers of each lamina being randomly oriented in the plane of the layer; the lead sheet being from 0.8 to 1.8 mm thick and each layer of reinforced thermoplastic being from 2 mm to 6 mm thick.

10. A combination in accordance with claim 9, wherein said component is an engine casing component of an internal combustion engine.

* * * * *